United States Patent [19]
Williams

[11] Patent Number: 5,918,556
[45] Date of Patent: Jul. 6, 1999

[54] LIFT APPARATUS AND METHOD FOR TRANSPLANTING TREES

[76] Inventor: Bryan G. Williams, 1297 Oakridge Rd., Oxford, Mich. 48371

[21] Appl. No.: 08/881,046

[22] Filed: Jun. 25, 1997

Related U.S. Application Data

[63] Continuation-in-part of application No. 08/646,880, May 8, 1996, abandoned.

[51] Int. Cl.⁶ .............................. A01C 11/04; A01G 23/02
[52] U.S. Cl. .......................... 111/101; 111/200; 111/919; 37/302; 37/195
[58] Field of Search ..................................... 111/101, 100, 111/103, 200, 900, 919; 37/302, 195

[56] References Cited

U.S. PATENT DOCUMENTS

| | | | |
|---|---|---|---|
| 2,314,567 | 3/1943 | Vogel | 111/101 |
| 2,769,278 | 11/1956 | Wassell et al. | 111/101 |
| 3,040,456 | 6/1962 | Pearce | 111/101 |
| 3,775,876 | 12/1973 | May | 111/101 |
| 3,936,960 | 2/1976 | Clegg | 111/101 |
| 4,271,611 | 6/1981 | Paul | 111/101 |
| 4,625,662 | 12/1986 | Heinzen | 111/101 |
| 4,756,259 | 7/1988 | Korenek | 111/101 |

*Primary Examiner*—Christopher J. Novosad
*Attorney, Agent, or Firm*—Lyon, P.C.

[57] ABSTRACT

Apparatus for lifting a mature tree for transplanting at a new location comprises a base disposed within a trench dug about the tree. At least one hydraulic actuator is connected to the base and to a horizontal member that overlies the root ball. A root ball harness attaches the root ball to the horizontal member. Energization of the actuator effects elevation of the cross member and the tree in vertical translation.

3 Claims, 3 Drawing Sheets

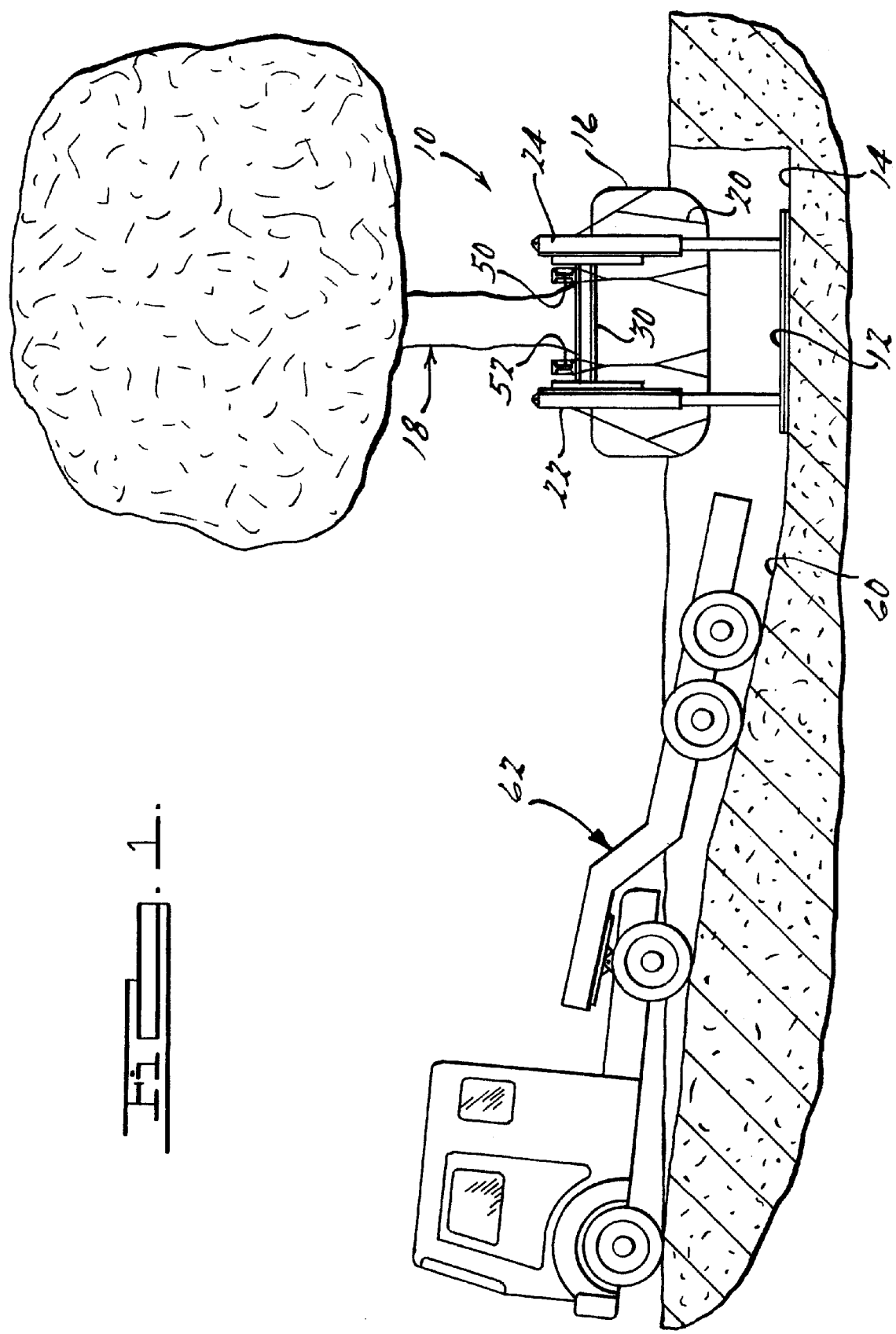

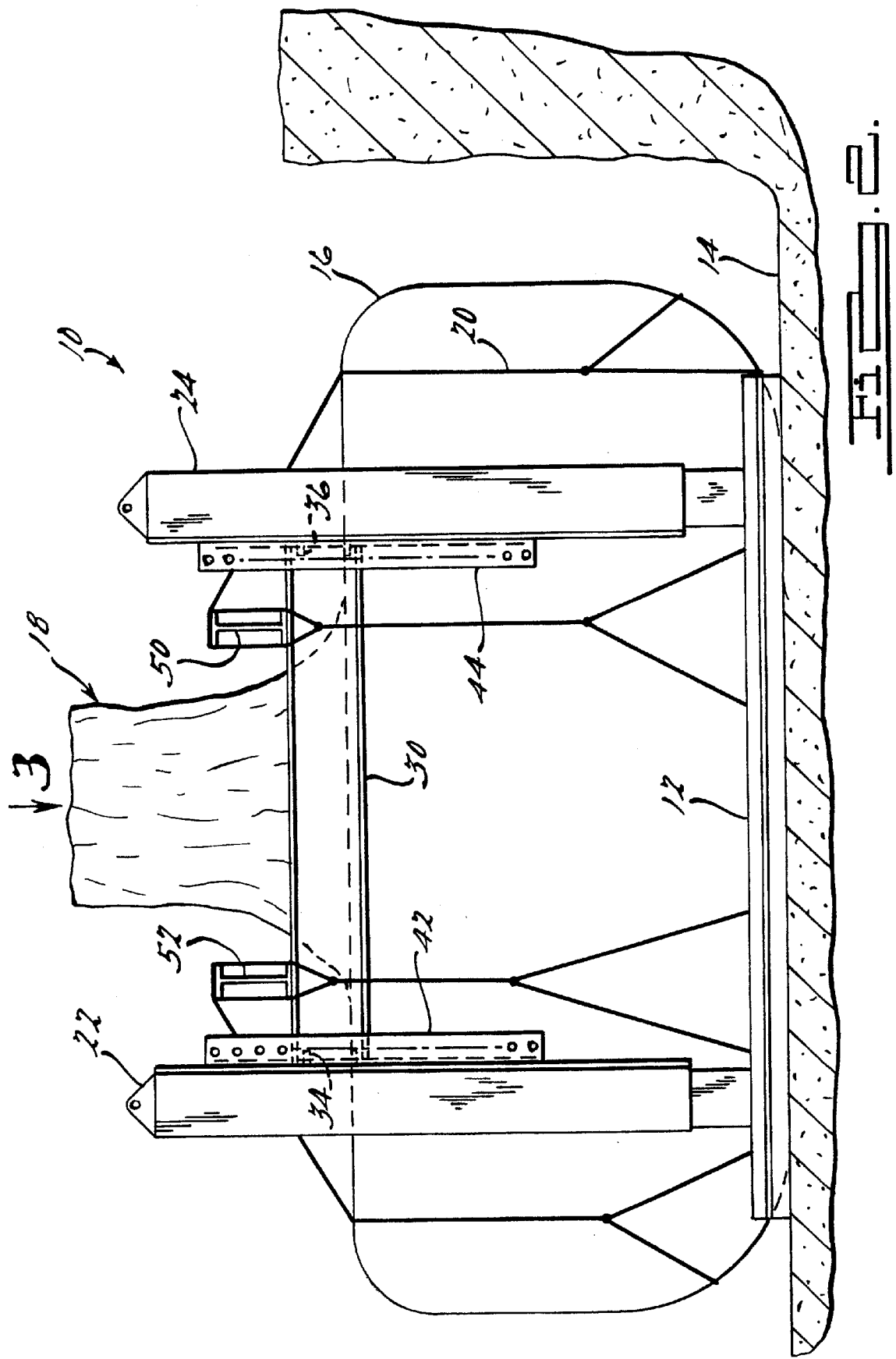

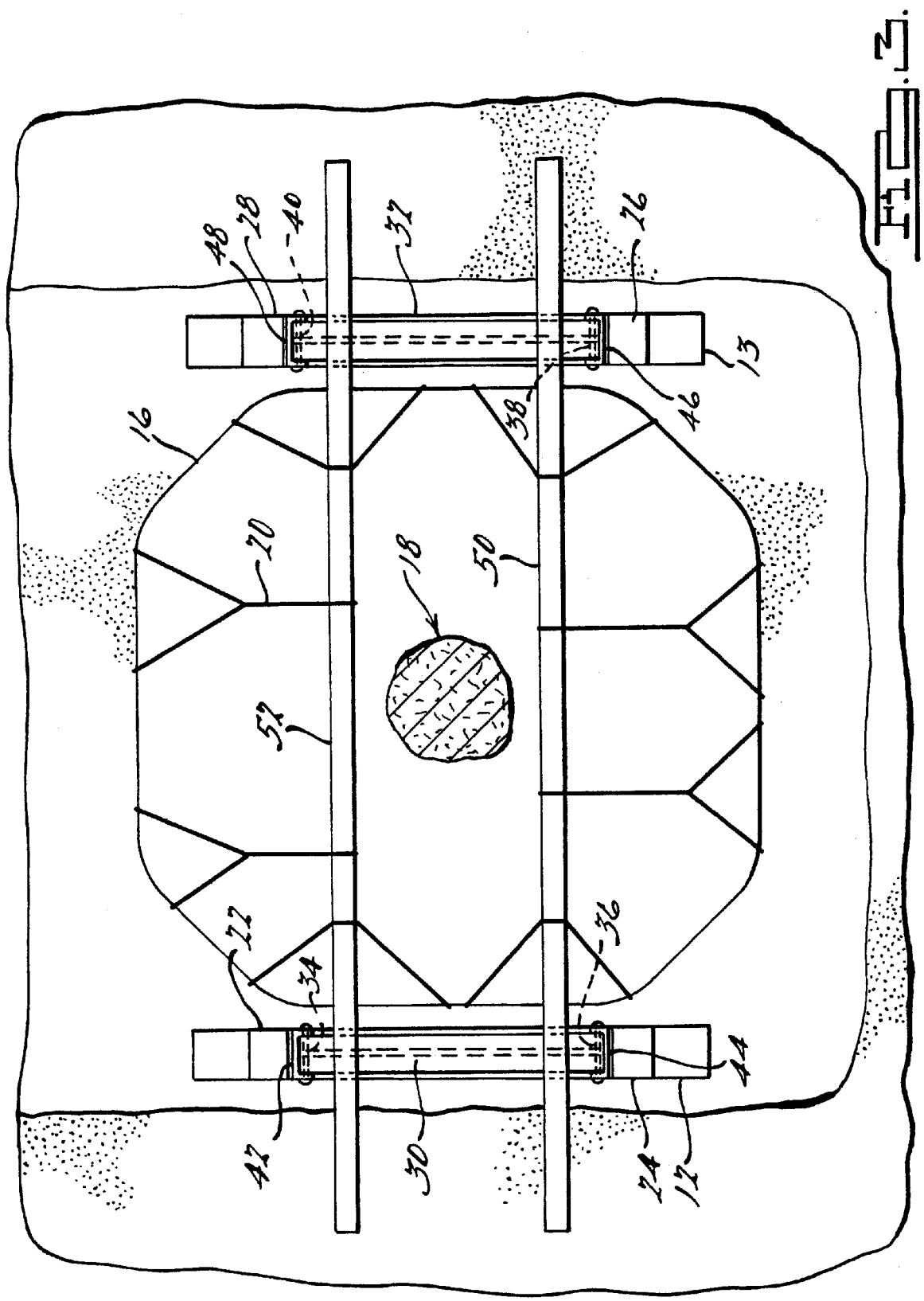

LIFT APPARATUS AND METHOD FOR TRANSPLANTING TREES

This application is a continuation-in-part of my application Ser. No. 08/646,880 filed May 8, 1996, now abandoned.

BACKGROUND OF THE INVENTION

The present invention relates to apparatus and a method for removing mature trees from the ground for transplant at a new location.

Numerous methods and associated apparatus have been utilized through the years for transplanting trees, shrubs, bushes, etc. Many of the known methods involve digging a trench around the base of the tree to define a root ball, encapsulating the root ball with a root ball harness, and lifting the root ball harness and root ball by cables attached to a vehicle mounted crane for transport to a new location.

While such known methods have achieved a certain degree of success, they have not proven to be entirely satisfactory. Specifically, when attempting to remove and transplant a mature tree weighing 20 tons or more, a relatively large and expensive crane has heretofore been required. Moreover, attachment of lift cables to the root ball harness and to the crane is time consuming and often results in damage to the tree since the point of attachment of the cables to the crane is generally well above the root ball where the cables can impact the tree's trunk or foliage. Therefore, a need exists for an improved apparatus and method that facilitates quick and easy removal of mature trees without requiring an accessary crane or inflicting damage to the tree.

SUMMARY OF THE INVENTION

An apparatus and method for lifting and transplanting a mature tree, in accordance with the present invention, fits within the conventional trench dug about the base of the tree and can easily be handled by a single operator. The lift apparatus is secured to the top of the root ball but below all foliage of the tree. An important feature of the invention is that the tree is elevated vertically in translation and the weight of the tree is transferred vertically downwardly to the base of the trench surrounding the tree.

More specifically, in accordance with a preferred constructed embodiment of the invention, the lift apparatus comprises a pair of base members that are positionable in spaced parallel relationship on opposite sides of the root ball at the bottom of a trench dug about the tree. A plurality of actuators, for example, hydraulic actuators, extend vertically upwardly from the base members. The actuators are connected by tie members which in turn support cross members that overlie and are attached to the root ball by, for example, a conventional root ball harness. The actuators have a range of extension sufficient to lift the root ball to a height, relative to the base members, to allow transport equipment to be moved under the root ball.

The present invention also contemplates a method for lifting a mature tree for transport to a new location comprising the steps of (1) digging a trench about the tree so as to define a root ball; (2) enclosing the root ball with a root ball harness; (3) positioning a pair of base members of a lift apparatus in spaced parallel relation at the bottom of the trench; (4) positioning a plurality of vertically extendable actuators on the base members; (5) tying the actuators to one another; (6) positioning cross members above the root ball; (7) securing the root ball to the cross members; and, (8) biasing said cross members vertically upwardly by extending said actuators thereby to lift said tree and root ball in vertical translation while transferring the weight thereof vertically downwardly to the ground.

The present invention will be more fully described in the following detailed description of the preferred embodiment taken in conjunction with the accompanying drawings.

BRIEF DESCRIPTION OF THE DRAWINGS

FIG. 1 is a side elevational view of apparatus for lifting a planted tree from the ground with the tree in an elevated position;

FIG. 2 is a view taken similar to FIG. 1 with in the tree and its root ball in condition for lift.

FIG. 3 is a view taken in the direction of the arrow 3 of FIG. 2.

DETAILED DESCRIPTION OF THE PREFERRED EMBODIMENT(S)

As best seen in the drawings, a lift apparatus 10, in accordance with a preferred constructed embodiment of the invention, comprises a pair of base members 12 and 13 which are positionable at the bottom of a trench 14 on opposite sides of a root ball 16 of a tree 18. A conventional root ball harness 20 is attached to the root ball 16.

A plurality of actuators 22–28, for example hydraulic cylinders, are supported by the base members 12 and 13 so as to be extendable vertically relative thereto. The actuators 22–28 can be controllably extended either manually or by fluid pressure from an external source (not shown) in the conventional manner.

An actuator tie member 30 extends between the actuators 22–24 and a similar tie member 32 extends between the actuators 26 and 28. The tie members 30 and 32 are adjustably secured to the actuators 22–24 and 26–28, respectively, by pins 34–40 that extend through perforated mounting plates 42–48 attached to the moveable components of the actuators 22–28, respectively.

The tie members 30 and 32 immediately underlie a pair of cross members 50 and 52 that are disposed immediately above the root ball 16 and to which the root ball harness 20 is connected.

The method of the present invention comprises digging the trench 14 about the base of the tree 18 in any conventional manner to define the root ball 16. The root ball support harness 20 is then fastened about the root ball 16 in the conventional manner.

The cross members 50 and 52 are then positioned on opposite sides of the trunk of the tree 18 and the support harness 20 is attached to the cross members 50 and 52. It is to be noted that the cross members 50 and 52 immediately overlie the root ball 16 and extend horizontally beyond the width thereof and of the trench 14.

The base members 12 and 13 are positioned at the bottom of the trench 14 on opposite sides of the root ball 16 and the actuators 22–28 attached thereto. The tie members 30 and 32 are then attached to the actuators 22–28 by the pins 34–40 so as to immediately underlie the cross members 50 and 52. The actuators 22–28 are then energized to bias the tie members 30 and 32 cross members 50 and 52, upwardly thereby lifting root ball 16 and tree 18 to a desired height.

As seen in FIG. 1 a ramp 60 may be dug to the trench 14, whereby a suitable flatbed trailer 62 can be backed down the ramp 60 and underneath the lifted root ball 16. The actuators 22–28 are then reversed so as to lower the tree 18 and root ball 16 directly onto the trailer 62.

From the forgoing it should be apparent that the lift apparatus 10 and method of the present invention permits a small crew of workmen to quickly assemble the lift apparatus and easily lift and remove large mature trees from the ground without using remotely mounted lifting equipment, such as a boom type crane truck.

The foregoing description of the preferred embodiment of the present invention is for illustrative purposes only. The various structural and operational features herein disclosed are susceptible to a number of modifications, none of which departs from the spirit and scope of the present invention as defined in the appended claims. For example, while the preferred embodiment has been described as including four actuators 22–28, this arrangement is not to be construed as limiting since a single actuator may be sufficiently strong to lift smaller trees. With such an arrangement, the tie members 30 and 32 and cross members 50 and 52 could be modified and attached to the single actuator in a cantilever arrangement.

I claim:

1. Apparatus for lifting a tree having an exposed root ball and a vertically extending trunk comprising:

a pair of base members positionable in horizontally spaced parallel relation on opposite sides of and at a base of said root ball;

two pairs of vertically extending fluid actuators having lower ends engaging opposite ends of said base members, respectively, said actuators having upper ends vertically movable relative to the lower ends thereof;

a pair of actuator tie members extending in horizontally spaced parallel relation to one another and in vertically spaced parallel relation to said base members, opposite ends of said tie members being supported by the upper ends of said actuators, respectively;

a pair of cross members overlying and extending at right angles to said tie members, respectively, said cross members extending horizontally in spaced parallel relation across a top of said root ball on opposite sides of and in close proximity to the trunk of said tree, and a root ball harness extending under said root ball and upwardly to said cross members for securing said root ball to said cross members whereby vertical extension of said actuators effects vertical translation of said root ball and tree relative to said base members and the weight of said tree and root ball is transferred vertically downwardly from said cross members to said tie members, thence through said actuators to said base members.

2. The apparatus of claim 1 including a plurality of vertically spaced attachment means on the upper ends of said actuators, respectively, for selectively engaging said tie members whereby a position of said tie members is vertically adjustable relative to the upper ends of said actuators.

3. A method of removing a planted tree having a root system for transport to a new location comprising the steps of:

digging a trench about the root system of the tree so as to define a root ball;

positioning a pair of base members at a bottom of the trench in spaced parallel relation on opposite sides of said root ball;

attaching a plurality of vertically extendable fluid actuators to said base members, respectively;

attaching a plurality of horizontally extending members to said actuators, respectively;

attaching said root ball to said horizontally extending members; and concomitantly energizing said actuators to lift said root ball and tree in vertical translation.

* * * * *